(12) United States Patent
Petria et al.

(10) Patent No.: US 10,673,914 B2
(45) Date of Patent: *Jun. 2, 2020

(54) NETWORK PROXY FOR ENERGY EFFICIENT VIDEO STREAMING ON MOBILE DEVICES

(71) Applicant: Intel Corporation, Santa Clara, CA (US)

(72) Inventors: Silviu Petria, Stilpeni (RO); George Milescu, Bucharest (RO); Bogdan Davidoaia, Giurgiu (RO)

(73) Assignee: Intel Corporation, Santa Clara, CA (US)

(*) Notice: Subject to any disclaimer, the term of this patent is extended or adjusted under 35 U.S.C. 154(b) by 205 days.

This patent is subject to a terminal disclaimer.

(21) Appl. No.: 15/804,696

(22) Filed: Nov. 6, 2017

(65) Prior Publication Data
US 2018/0167428 A1    Jun. 14, 2018

Related U.S. Application Data

(63) Continuation of application No. 14/576,865, filed on Dec. 19, 2014, now Pat. No. 9,813,465.

(51) Int. Cl.
*H04L 29/06* (2006.01)
*H04L 29/08* (2006.01)
(Continued)

(52) U.S. Cl.
CPC ...... *H04L 65/4069* (2013.01); *H04L 65/4084* (2013.01); *H04L 65/605* (2013.01);
(Continued)

(58) Field of Classification Search
CPC ..... H04L 65/4069; H04L 69/14; H04L 67/28; H04L 69/163; H04L 67/2828;
(Continued)

(56) References Cited

U.S. PATENT DOCUMENTS 9,497,231 B2 * 11/2016 Shankarraman .... H04L 65/1069
9,813,465 B2    11/2017 Petria et al.
(Continued)

FOREIGN PATENT DOCUMENTS

CN    103476099    12/2013
CN    103620576    3/2014
(Continued)

OTHER PUBLICATIONS

"European Application Serial No. 15870630.9, Response filed Jan. 11, 2019 to Extended European Search Report dated Jun. 14, 2018", 15 pgs.
(Continued)

*Primary Examiner* — Patrice L Winder
(74) *Attorney, Agent, or Firm* — Schwegman Lundberg & Woessner, P.A.

(57) ABSTRACT

Examples of systems and methods for network proxy server for energy efficient video streaming on mobile devices are generally described herein. A proxy server to deliver video content may include a communication module to intercept a request for video content from a mobile device, the request for video content intended for a content server and forward a modified request for the video content to the content server. The communication module may receive the video content from the content server and transfer a portion of the video content to the mobile device using a multipath transport protocol.

22 Claims, 4 Drawing Sheets

(51) Int. Cl.
*H04W 40/02* (2009.01)
*H04W 76/30* (2018.01)
*H04W 84/12* (2009.01)

(52) U.S. Cl.
CPC .............. *H04L 67/28* (2013.01); *H04L 69/14* (2013.01); *H04W 40/02* (2013.01); *H04W 76/30* (2018.02); *H04L 65/80* (2013.01); *H04L 67/2804* (2013.01); *H04L 67/2819* (2013.01); *H04L 67/2828* (2013.01); *H04L 69/163* (2013.01); *H04W 84/12* (2013.01); *Y02D 50/30* (2018.01)

(58) Field of Classification Search
CPC .............. H04L 67/2819; H04L 67/2804; H04L 65/4084; H04L 65/605; H04L 65/80; H04W 76/30; H04W 84/12; Y02D 50/30
See application file for complete search history.

(56) References Cited

U.S. PATENT DOCUMENTS

| | | | |
|---|---|---|---|
| 10,020,959 B1* | 7/2018 | Edelhaus | .............. H04L 12/462 |
| 2007/0294254 A1 | 12/2007 | Yao | |
| 2012/0023190 A1 | 1/2012 | Backholm et al. | |
| 2012/0093150 A1 | 4/2012 | Kini | |
| 2012/0110118 A1 | 5/2012 | Luna et al. | |
| 2012/0135726 A1 | 5/2012 | Luna et al. | |
| 2013/0275563 A1 | 10/2013 | Luna et al. | |
| 2013/0282793 A1 | 10/2013 | Swings et al. | |
| 2015/0215225 A1 | 7/2015 | Mildh et al. | |
| 2016/0182581 A1 | 6/2016 | Petria et al. | |
| 2016/0315976 A1 | 10/2016 | Detal et al. | |

FOREIGN PATENT DOCUMENTS

| | | |
|---|---|---|
| EP | 2763362 A1 | 8/2014 |
| WO | WO-2012161751 A1 | 11/2012 |
| WO | WO-2014040463 A1 | 3/2014 |
| WO | WO-2016099836 A1 | 6/2016 |

OTHER PUBLICATIONS

"European Application Serial No. 15870630.9, Extended European Search Report dated Jun. 14, 2018", 9 pgs.

"U.S. Appl. No. 14/576,865, Corrected Notice of Allowance dated Aug. 2, 2017", 5 pgs.

"U.S. Appl. No. 14/576,865, Non Final Office Action dated Mar. 10, 2017", 7 pgs.

"U.S. Appl. No. 14/576,865, Notice of Allowance dated Jul. 7, 2017", 5 pgs.

"U.S. Appl. No. 14/576,865, Response filed Jun. 9, 2017 to Non Final Office Action dated Mar. 10, 2017", 8 pgs.

"International Application Serial No. PCT/US2015/062918, International Search Report dated Mar. 8, 2016", 5 pgs.

"International Application Serial No. PCT/US2015/062918, Written Opinion dated Mar. 8, 2016", 5 pgs.

"Chinese Application Serial No. 201580062812.1, Office Action dated Dec. 3, 2019", 8 pgs.

* cited by examiner

_US 10,673,914 B2_

NETWORK PROXY FOR ENERGY EFFICIENT VIDEO STREAMING ON MOBILE DEVICES

PRIORITY APPLICATION

This application is a continuation of U.S. application Ser. No. 14/576,865, filed Dec. 19, 2014, which is incorporated herein by reference in its entirety.

BACKGROUND

Energy consumption for mobile video streaming is influenced by network traffic patterns used to download the video data, such as the amount of available bandwidth that is being used at any given time. An inefficient pattern may needlessly keep wireless network protocol interfaces in an active state, which may cause a mobile device to consume an amount of energy disproportionate to the volume of transferred data. Using a single path from a content server to the mobile device may delay delivery of the video and cause additional energy to be consumed by the mobile device.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Reducing energy used by a mobile device when receiving video data may include using a proxy server or a multipath protocol. The traffic pattern between a content server and a mobile device may be altered to include a proxy server to intercept data sent and received by the mobile device. The proxy server may retrieve video content from a content server at the request of the mobile device and send the video content to the mobile device in a way that consumes less energy at the mobile device than if the mobile device received the video content directly from the content server.

In an example, time spent by a mobile device in an initial buffering state for video content may be reduced using a multipath transport protocol (e.g., multipath transmission control protocol, MPTCP). The reduced time may cause less energy to be consumed by the mobile device or improve user experience. The multipath transport protocol may be used to aggregate network bandwidth available on a plurality of connection interfaces.

In an example, the multipath transport protocol may be used with a 3rd Generation (3G), 4th Generation (4G), or 5th Generation (5G) network interface connection. The network interface may consume the same amount of energy at a mobile device when transferring data regardless of throughput. In another example, the multipath transport protocol may use a wireless protocol network interface connection, such as a WiFi interface. The WiFi interface may consume energy proportionally to the network throughput. A video streaming application or delivery method on a mobile device, such as a mobile application or a web browser, may limit the data transfer rate to the mobile device to a fraction of the available bandwidth in order to keep the total data downloaded low or to an appropriate amount, since users often cancel or navigate away from a video before the video is complete. However, keeping the total data downloaded to an appropriate level causes higher energy to be consumed by the mobile device.

A technique for keeping the total data downloaded low while also lowering energy consumption on a mobile device may include using bursts of data sent from a proxy server to the mobile device where throughput to the mobile device is maximized. Idle periods may also be extended to keep energy usage low. By extending an idle period, the mobile device may consume less energy. Another technique for decreasing energy usage may include minimizing the energy used by the mobile device to power a display screen while waiting for a video to start. By aggregating available bandwidth on a multipath transport protocol, video may be retrieved faster by the mobile device and the time the mobile device is powering the display without showing the video may be decreased, decreasing the total time the screen is on.

Figure 1:
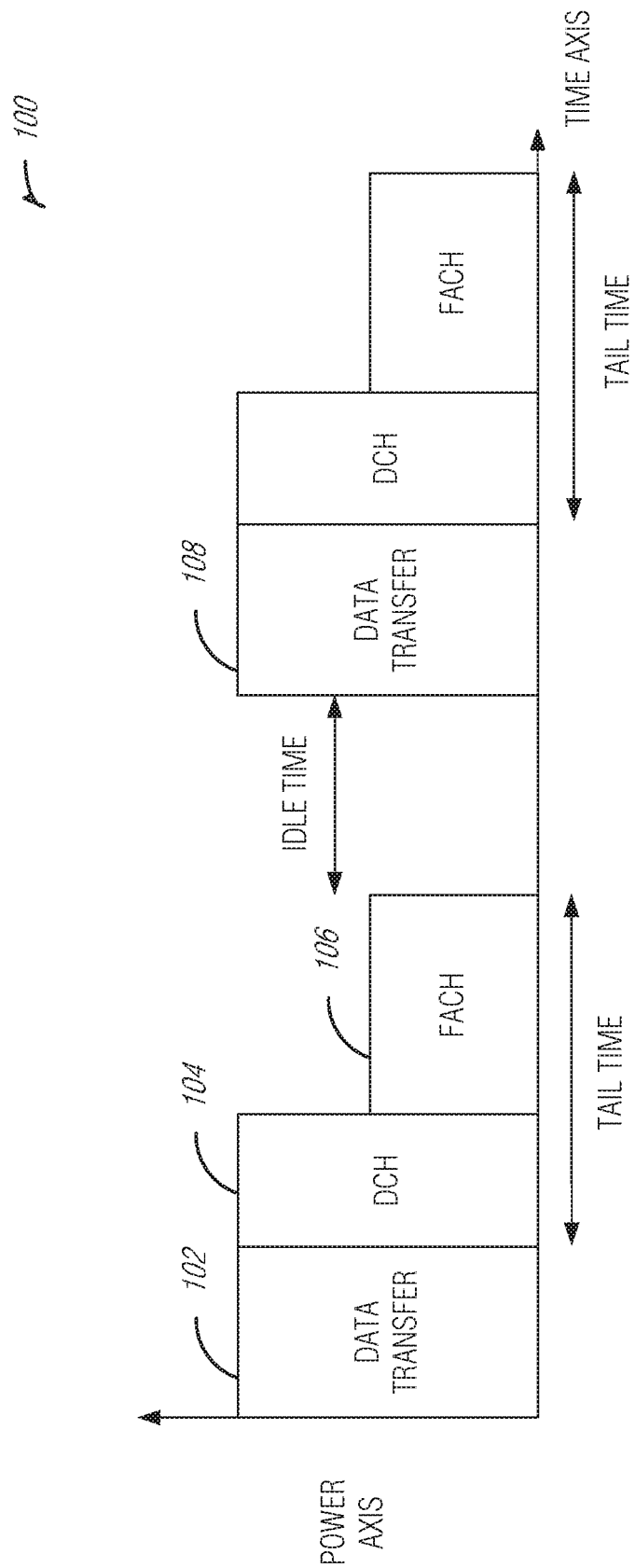
FIG. 1 is a diagram illustrating 3rd Generation (3G) power states for data transfer, according to an embodiment.

FIG. 1 shows a diagram 100 illustrating 3rd Generation (3G) power states for data transfer, according to an embodiment. In an example, a mobile device operating on a 3G network uses different power states for data transfer over time. For example, the mobile device may be in a dedicated channel (DCH) with data transfer state 102, transition to a DCH without data transfer state 104, and proceed to a forward access channel (FACH) state 106 before a network interface of the mobile device enters an idle state. The transitions between states may include transitioning after expiration of a timer. The transition between the DCH with data transfer state 102 and the DCH without data transfer state 104 may occur when no additional data is transferred to or from the mobile device. The transition may not be marked or defined but may be a specified amount of time before the DCH without data transfer state 104 transitions to the FACH state 106. In an example, a first timer, such as a power transition timer T1, may run when no data is sent to or received by the mobile device when the mobile device is in the DCH with data transfer state 102. When the first timer starts, the mobile device may transition to the DCH without data transfer state 104. When the first timer expires, the mobile device may transition to the FACH state 106. When in the FACH state 106, a second timer, such as a power transition timer T2, may start. When the second timer expires, the network interface of the mobile device may transition from the FACH state 106 to an idle state. In an example, a proxy server may keep the network interface of the mobile device from entering the idle state by keeping the first timer T1 from starting or expiring, keeping the mobile device in one of the DCH states. For example, the proxy server may send data to the mobile device before the first timer T1 starts, keeping the mobile device in the DCH with data transfer state 102. In another example, the proxy server may send data to the mobile device before the first timer T2 expires but after it starts, transitioning the mobile device from the DCH without data transfer state 104 to the DCH with data transfer state 102.

The time between the FACH state 106 and the next data transfer state 108 may be idle time for the network interface of the mobile device, such as where there is no data transfer or minimal or no power is used for data transfer. In an example, the DCH without data transfer state 104 and the FACH state 106 are in a tail time period because active data transfer may be not occurring during these states. By using a proxy server, the idle time between the FACH state 106 and the next data transfer state 108 may be increased, decreasing the amount of energy used by the mobile device.

When the data transfer in the DCH with data transfer state 102 completes, the network interface of the mobile device does not immediately go into an idle state, but instead continues to consume tail energy while in the DCH without data transfer state 104, at a high power, and the FACH state 106, at a medium power. Since the time the mobile device is in a DCH without data transfer state 104 or FACH state 106 is independent of how long the mobile device is in the DCH with data transfer state 102, maximizing the time the mobile device is in the DCH with data transfer state 102 will decrease the energy used by the mobile device. For example, if the network interface of the mobile device was in the DCH with data transfer state 102 for only a short period of time relative to the idle time and had to enter the second data transfer state 108 shortly thereafter, the mobile device would consume more energy to download an amount of data than if the mobile device downloaded the same amount of data in a single DCH with data transfer state 102.

A technique to decrease energy usage in a mobile device may include minimizing transitions to tail states and maximizing throughput at the mobile device during data transfer. This technique may include a custom network transfer pattern and a proxy server. The proxy server may intercept data sent by the mobile device intended for a content server. The proxy server may send content, such as video, to the mobile device using a high throughput connection. To intercept data, the proxy server may intercept data by direct data access as a middle-man, through use of a known proxy, through another intermediary point that is known to be receiving the data, or with a content server. The proxy server may alert the mobile device that it is intercepting data, the mobile device may instruct the proxy server to intercept the data, a content server may instruct the proxy server to intercept the data, or the proxy server may be preselected to intercept the data from the mobile device. In another example, the proxy server may intercept the data without obtaining consent or alerting the mobile device. The mobile device or a content server may not be aware that the proxy server is intercepting data from the mobile device (e.g., the proxy server may intercept data silently without changing how the mobile device operates).

The proxy server may intercept a request from the mobile device for video content and fetch the video content from the content server. If the video data is being stored in a content delivery network (CDN), the data may be retrieved from multiple servers by the proxy server. After the data is retrieved by the proxy server, it may be delivered to the mobile device in an energy efficient pattern. For each connection to the mobile device, such a pattern may include sending data associated with the connection in a single burst that maximizes the bandwidth. The video data may be retrieved using a single transport connection or multiple transport connections. The energy optimization technique using the proxy server may be applied on each connection separately.

The energy optimization technique may be used without modifying the client, the server, or the client-server protocol. The proxy server may be transparent for the video streaming ecosystem (e.g., the mobile device or the content server may not be able to detect any substantial difference in operation with the proxy server). The proxy server may work with different mobile video streaming applications and multiple CDNs with only minimal configuration in order to be able to identify specific request formats.

The proxy server may modify the request for the video content from the mobile device to include a modified user agent and allow a fast download to maximize proxy server inbound bandwidth. The proxy server may fetch the video content from the content server quicker than a mobile client would. The proxy server may deliver a portion of the video content that may allow for playback to start on the mobile device without a significant delay or with an increase in speed.

When rendering a video, a video streaming client may not start playback until a certain amount of data has been buffered. This may be detrimental for battery life and for user experience since the waiting time may be significant if the network connection is poor. For example, the screen on a mobile device may stay on while buffering, displaying a specific message for the user. On a mobile device, the screen may be one of the biggest energy consumers.

In an example, bandwidth aggregation may be based on a multipath transport protocol. For example, the multipath transport protocol may include a 3G, 4G, 5G, or the like, connection path and a WiFi connection path for a distinct portion of video content or data. In an example, the 3G, 4G, or 5G network connection may help the WiFi connection retrieve the data faster. For a WiFi connection with a limited bandwidth, the amount of energy spent on initiating a 3G, 4G, or 5G connection may be less than the energy consumed by the screen while waiting for the video to start. Therefore using both connections may result in an improved overall energy consumption and user experience. In an example, the 3G, 4G, or 5G may be enabled only during the initial buffering period (e.g., from when the video transfer begins to the start of playback on the mobile device). After playback starts, the display screen on the mobile device will be on to display the video, so the 3G, 4G, or 5G connection may be disabled to decrease energy consumption.

Although many examples include video content, downloading any application or data at a mobile device may be improved by using the techniques set out above and below. For example, energy consumption of a mobile device when downloading large applications, pages in a large document, audio files, or the like may be improved using a proxy server or multipath transport protocol. If the network proxy server is used as a forward proxy server, the mobile device may make network configurations to connect to the proxy server. If the network proxy server is used as a reverse proxy server, (e.g., in the cloud), no additional client configurations may be needed.

The network pattern proxy server may be set up anywhere between the client and the content server or servers. Setting up the proxy server closer to the mobile device may decrease the energy consumption of the mobile device, such as if the network connection is poor. For example, the network connection may impact the pattern sent by the proxy server. A proxy server close to the mobile device (e.g., on the network gateway of an office building) may allow the proxy server to handle a relatively low number of requests, increasing speed and bandwidth for the mobile device. In another example, the proxy server may be close to the content server or servers, and a large number of requests may be handled through load balancing over multiple proxy server instances. For example, a proxy server from a plurality of proxy servers may be used to intercept a request for video content from a mobile device. The plurality of proxy servers may be used to download the video content from a content server or content servers. The plurality of proxy servers may send a portion of the video content to the mobile device. The plurality of proxy servers may include relay proxy servers to send the video content to proxies closer to the mobile device or dedicated proxy servers for the mobile device. The plurality of proxy servers may include different proxy servers for different connections in the multipath transport protocol.

In another example, mobile device energy usage may be decreased by caching a fetched video on the proxy server to avoid needing to download the video more than once from a content server. The cached video may be used for a mobile device making more than one request for the cached video, such as when a user requests to re-watch a video and the video is not stored locally at the mobile device. The cached video may also be used for more than one mobile device, such as if multiple mobile devices request the same video. The cached video may be stored on a different proxy server. For example, a technique may include using a network pattern proxy server to intercept a request for video content from a mobile device and a cache proxy server to store the video content after it is downloaded and sent to the mobile device. The network pattern proxy server may first check the cache proxy server for the requested video content before sending the request to the content server.

Figure 2:
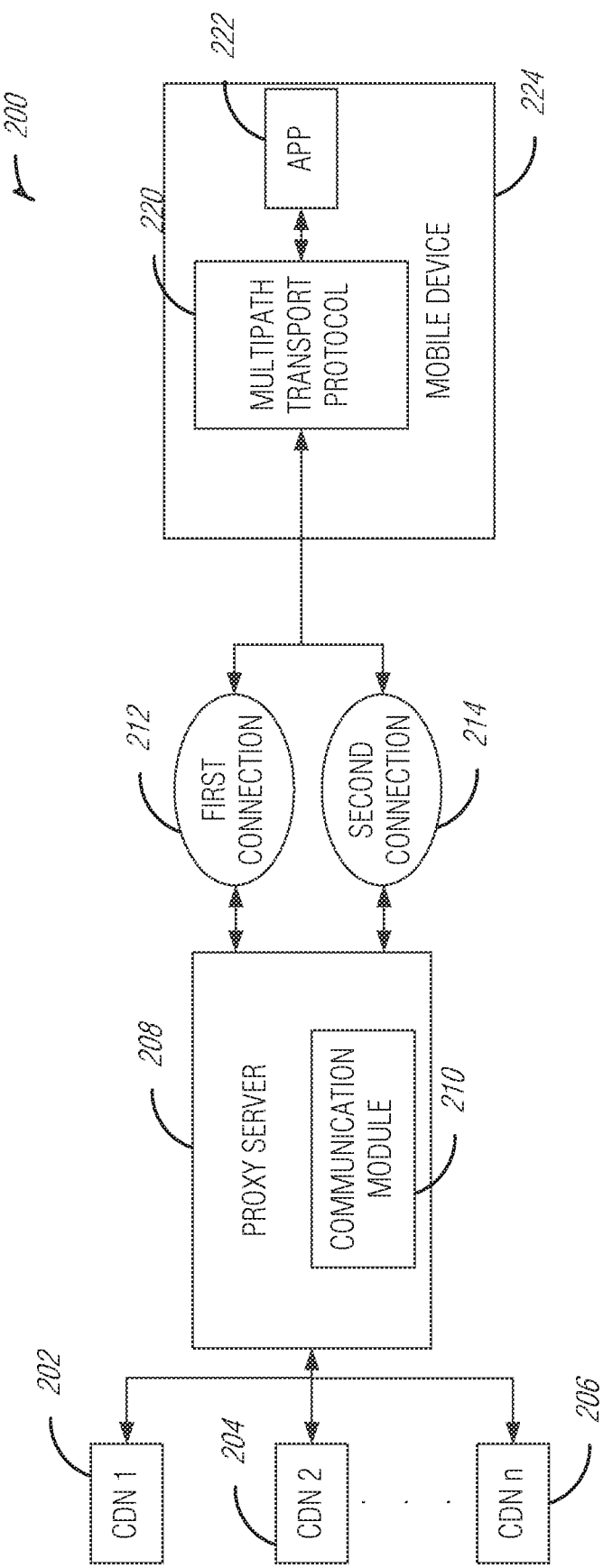
FIG. 2 is a block diagram illustrating data flow through a network proxy server using a multipath transport protocol (e.g., NIPTCP), according to an embodiment.

FIG. 2 shows a block diagram 200 illustrating data flow through a network proxy server using a multipath transport protocol (e.g., MPTCP), according to an embodiment. The block diagram 200 includes various content delivery network servers 202, 204, 206, a proxy server 208, and a mobile device 224. In an example, the mobile device 224 may send a request for content to the proxy server 208 using a first connection 212 or a second connection 214. The request may be intended for a content delivery server n 206 and may be intercepted by a communication module 210 of the proxy server 208. The communication module 210 may forward a modified request for the content to one or more of the content servers 202, 204, 206. The communication module 210 may receive the content from one or more of the content servers 202, 204, 206. The communication module 210 may transfer a portion of the content to the mobile device 224 using the first connection 212 and the second connection 214. The transfer may include a multipath transport protocol 220 to receive communication via both the first connection 212 and the second connection 214. The mobile device 224 may include a mobile application (app) 222 to send or receive content via the multipath transport protocol connections to and from the proxy server 208.

In an example, to transfer the portion of the content, the communication module 210 may maintain a high throughput data connection with the mobile device until the portion of the content is fully transferred to the mobile device. For example, the communication module 210 may keep a network interface of the mobile device from entering an idle state until after the portion of the content is entirely transferred. The communication module 210 may turn off one of the first connection 212 or the second connection 214 when the content playback starts on the mobile device. In another example, to transfer the portion of the content to the mobile device, the communication module 210 may delay transferring any of the portion of the content until the entire portion of the content is received from the content server n 206.

The communication module 210 may receive a request for a second portion of the content from the mobile device 224 and may transfer the second portion of the content to the mobile device 224 using the multipath transport protocol 220. In an example, to intercept the request for content, the communication module 210 of the proxy server 208 may receive information from the app 222 on the mobile device 224. The information may indicate the request for content. In another example, the communication module 210 may intercept all data sent by the mobile device 224 or all data sent over the multipath transport protocol 220.

In an example, the first connection 212 may include a wireless protocol connection according to an IEEE 802.11 family of standards. In another example, the second connection 214 may include a 3rd Generation (3G) radio access technology (RAT) network connection that is a Universal Mobile Telecommunications System (UMTS) or Evolved High Speed Packet Access (HSPA+) standard based network.

Figure 3:
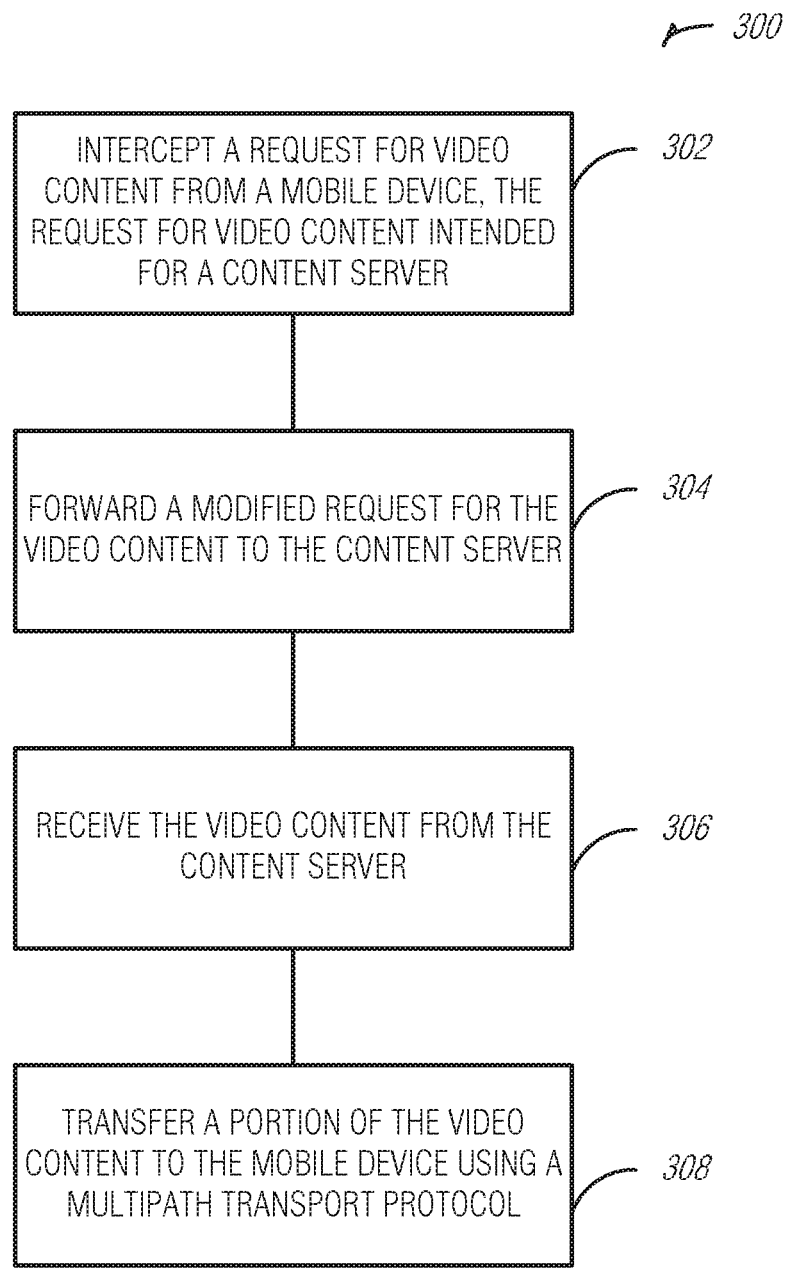
FIG. 3 is a flowchart illustrating a method for transferring video content through a network proxy server using a multipath protocol (MPTCP), according to an embodiment.

FIG. 3 shows a flowchart illustrating a method 300 for transferring video content through a network proxy server using a multipath transport protocol (e.g., a dual path protocol, MPTCP, etc.), according to an embodiment. The method 300 may include an operation 302 to intercept a request for video content from a mobile device, the request for video content intended for a content server. In an example, intercepting the request may include receiving information from a mobile application on the mobile device indicating a request for video content. The video content may be delivered to the mobile device using the mobile application. The mobile application may include a popular application configured to use the proxy server and multipath transport protocol, or may be a special mobile application used for sending video content via the proxy server and using multipath transport protocol. In another example, intercepting the request may include intercepting, at the proxy server, all data sent by the mobile device. In an example, the proxy server may receive all data from the mobile device and allow non-video content to continue to its destination.

The method 300 may include an operation 304 to forward a modified request for the video content to the content server. The modified request may include the original request from the mobile device. In another example, the modified request may omit details about the mobile device.

In an example, the method 300 includes an operation 306 to receive the video content from the content server. For example, a proxy server may receive video content from a single content server or from multiple content servers/a plurality of content servers, such as from a content delivery network (CDN). Portions of the video content may be received in full from a single server or from multiple servers.

The method 300 may include an operation 308 to transfer a portion of the video content to the mobile device using a multipath transport protocol. Transferring the portion of the video content may include maintaining a high throughput data connection between the proxy server and the mobile device until the portion of the video content is transferred to the mobile device. In an example, transferring the portion of the video content or maintaining the high throughput data connection may include not allowing the network interface of the mobile device to enter an idle state until after the portion of the video content is entirely transferred. In another example, transferring the portion of the video content may include delaying transferring any portion of the video content until the entire portion of the video content (or the entirety of the video content, in another example) is received at the proxy server from the content server. In yet another example, the method 300 may include receiving a request from the mobile device for a second portion of the video content and transferring the second portion of the video content from the proxy server to the mobile device using the multipath transport protocol. A high throughput data connection may include a data connection in a DCH state, or a data connection with a throughput of greater than the throughput achieved on a FACH state connection. The high throughput data connection may be measured in bits per second, data packets per second, hits per time slot, or data packets per time slot. For example, maintaining a high throughput data connection between the proxy server and the mobile device until the portion of the video content is transferred may include the network interface of the mobile device remaining in a DCH state and not transitioning to a FACH state or idle state before the transfer is complete.

The multipath transport protocol may include a plurality of paths from the proxy server to the mobile device. One path may include a wireless protocol connection, such as according to an IEEE 802.11 family of standards (e.g., WiFi). Another path may include a 3rd Generation (3G) radio access technology (RAT) network connection that is a Universal Mobile Telecommunications System (UMTS) or Evolved High Speed Packet Access (HSPA+) standard based network. Another path may include a 3rd Generation Partnership Project (3GPP) long term evolution (LTE) or LTE-advanced network connection, such as a 4G or 4G LTE connection. The multipath transport protocol may include any two or more connections, including repeating types. For example, the method 300 may include connecting using the wireless protocol connection and the 3G RAT network connection. The method 300 may then include turning off the 3G RAT network connection when the video playback starts on the mobile device. In another example, the method 300 may include turning off one or more connections in the multipath transport protocol (or the multipath transport protocol entirely) when transferring of the portion of the video content is complete.

Figure 4:
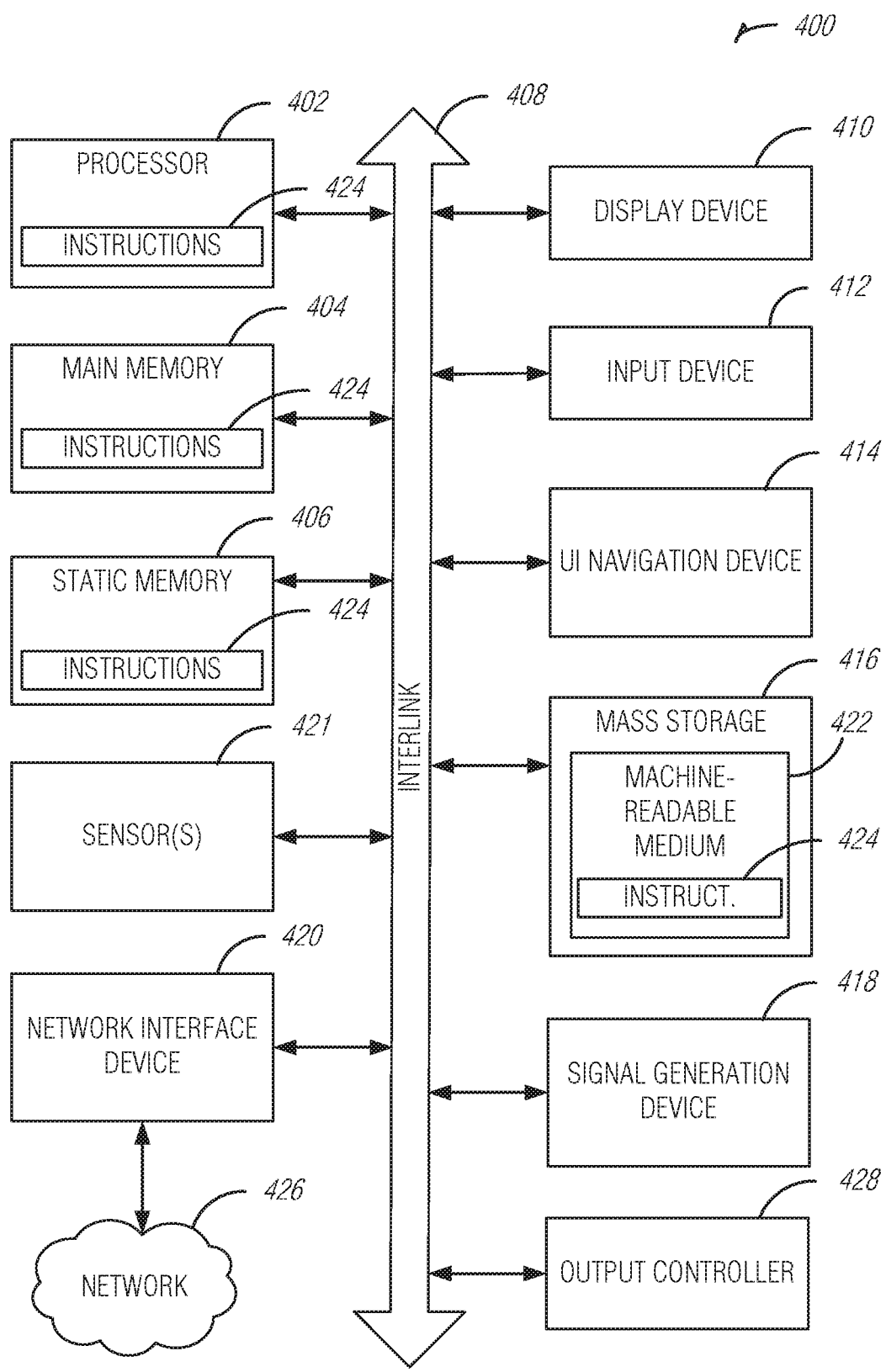
FIG. 4 is a block diagram of a machine upon which any one or more of the techniques (e.g., methodologies) discussed herein may perform, according to an embodiment.

FIG. 4 shows a block diagram of a machine 400 upon which any one or more of the techniques (e.g., methodologies) discussed herein may perform, according to an embodiment. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, alphanumeric input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB), parallel, or other wired or wireless (e.g., infrared (1R), near field communication (NFC), etc.) connection to communicate or control one or more peripheral devices (e.g., a printer, card reader, etc.).

The storage device 416 may include a machine readable medium 422 that is non-transitory on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks. The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO, multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software.

VARIOUS NOTES & EXAMPLES

Each of these non-limiting examples can stand on its own, or can be combined in various permutations or combinations with one or more of the other examples.

Example 1 includes the subject matter embodied a proxy server to deliver video content comprising: a communication module to: intercept a request for video content from a mobile device, the request for video content intended for a content server, forward a modified request for the video content to the content server, receive the video content from the content server, and transfer a portion of the video content to the mobile device using a multipath transport protocol.

In Example 2, the subject matter of Example 1 may optionally include wherein to transfer the portion of the video content, the communication module is to maintain a high throughput data connection with the mobile device until the portion of the video content is transferred to the mobile device.

In Example 3, the subject matter of one or any combination of Examples 1-2 may optionally include wherein the communication module is to receive a request for a second portion of the video content from the mobile device and transfer the second portion of the video content to the mobile device using the multipath transport protocol.

In Example 4, the subject matter of one or any combination of Examples 1-3 may optionally include wherein the content server is a plurality of content servers.

In Example 5, the subject matter of or any combination of Examples 1-4 may optionally include wherein to transfer the portion of the video content to the mobile device, the communication module is to keep a network interface of the mobile device from entering an idle state until after the portion of the video content is transferred.

In Example 6, the subject matter of one or any combination of Examples 1-5 may optionally include wherein to keep the network interface of the mobile device from entering the idle state, the communication module is to prevent a power transition timer running on the mobile device from expiring.

In Example 7, the subject matter of one or any combination of Examples 1-6 may optionally include wherein to transfer the portion of the video content to the mobile device, the communication module is to delay transferring any of the portion of the video content until the portion of the video content is received from the content server.

In Example 8, the subject matter of one or any combination of Examples 1-7 may optionally include wherein to intercept the request for video content, the communication module is to receive information from a mobile application on the mobile device indicating the request for video content.

In Example 9, the subject matter of one or any combination of Examples 1-8 may optionally include wherein the communication module is to intercept all data sent by the mobile device.

In Example 10, the subject matter of one or any combination of Examples 1-9 may optionally include wherein one path of the multipath transport protocol includes a wireless protocol connection according to an IEEE 802.11 family of standards.

In Example 11, the subject matter of one or any combination of Examples 1-10 may optionally include wherein one path of the multipath transport protocol includes a 3rd Generation (3G) radio access technology (RAT) network connection that is a Universal Mobile Telecommunications System (UMTS) or Evolved High Speed Packet Access (HSPA+) standard based network.

In Example 12, the subject matter of one or any combination of Examples 1-11 may optionally include wherein the communication module is to turn off the 3G RAT network connection when the video playback starts on the mobile device.

In Example 13, the subject matter of one or any combination of Examples 1-12 may optionally include wherein one path of the multipath transport protocol includes a 3rd Generation Partnership Project (3GPP) long term evolution (LTE) or LTE-advanced network connection.

In Example 14, the subject matter of one or any combination of Examples 1-13 may optionally include wherein the communication module is to turn off the 3GPP LTE or LTE-advanced network connection when the video playback starts on the mobile device.

Example 15 includes the subject matter embodied by a method for using a proxy server to deliver video content comprising: intercepting a request for video content from a mobile device, the request for video content intended for a content server, forwarding a modified request for the video content to the content server, receiving the video content from the content server, and transferring a portion of the video content to the mobile device using a multipath transport protocol.

In Example 16, the subject matter of Example 15 may optionally include wherein transferring the portion of the video content includes maintaining a high throughput data connection with the mobile device until the portion of the video content is transferred to the mobile device.

In Example 17, the subject matter of one or any combination of Examples 15-16 may optionally include further comprising receiving a request for a second portion of the video content from the mobile device and transferring the second portion of the video content to the mobile device using the multipath transport protocol.

In Example 18, the subject matter of one or any combination of Examples 15-17 may optionally include wherein the content server is a plurality of content servers.

In Example 19, the subject matter of one or any combination of Examples 15-18 may optionally include wherein transferring the portion of the video content to the mobile device includes keeping a network interface of the mobile device from entering an idle state until after the portion of the video content is transferred.

In Example 20, the subject matter of one or any combination of Examples 15-19 may optionally include wherein keeping the network interface of the mobile device from entering an idle state includes preventing a power transition ticker running on the mobile device from expiring.

In Example 21, the subject matter of one or any combination of Examples 15-20 may optionally include wherein transferring the portion of the video content to the mobile device includes delaying transferring any of the portion of the video content until the portion of the video content is received from the content server.

In Example 22, the subject matter of one or any combination of Examples 15-21 may optionally include wherein intercepting the request for video content includes receiving information from a mobile application on mobile device indicating the request for video content.

In Example 23, the subject matter of one or any combination of Examples 15-22 may optionally include further comprising intercepting all data sent by the mobile device.

In Example 24, the subject matter of one or any combination of Examples 15-23 may optionally include wherein one path of the multipath transport protocol includes a wireless protocol connection according to an IEEE 802.11 family of standards.

In Example 25, the subject matter of one or any combination of Examples 15-24 may optionally include wherein one path of the multipath transport protocol includes a 3rd Generation (3G) radio access technology (RAT) network connection that is a Universal Mobile Telecommunications System (UMTS) or Evolved High Speed Packet Access (HSPA+) standard based network.

In Example 26, the subject matter of one or any combination of Examples 15-25 may optionally include further comprising turning off the 3G RAT network connection when the video playback starts on the mobile device.

In Example 27, the subject matter of one or any combination of Examples 15-26 may optionally include wherein one path of the multipath transport protocol includes a 3rd Generation Partnership Project (3GPP) long term evolution (LTE) or LTE-advanced network connection.

In Example 28, the subject matter of one or any combination of Examples 15-27 may optionally include further comprising turning off the 3GPP LTE or LTE-advanced network connection when the video playback starts on the mobile device.

Example 29 includes at least one machine-readable medium including instructions for receiving information, which when executed by a machine, cause the machine to perform any of the methods of Examples 15-28.

Example 30 includes an apparatus comprising means for performing any of the methods of Examples 15-28.

Example 31 includes the subject matter embodied by an apparatus for using a proxy server to deliver video content comprising: means for intercepting a request for video content from a mobile device, the video content intended for a content server, means for forwarding a modified request for the video content to the content server, means for receiving the video content from the content server, and means for transferring a portion of the video content to the mobile device using a multipath transport protocol.

In Example 32, the subject matter of Example 31 may optionally include wherein the means for transferring the portion of the video content include means for maintaining a high throughput data connection with the mobile device until the portion of the video content is transferred to the mobile device.

In Example 33, the subject matter of one or any combination of Examples 31-32 may optionally include further comprising means for receiving a request for a second portion of the video content from the mobile device and means for transferring the second portion of the video content to the mobile device using the multipath transport protocol.

In Example 34, the subject matter of one or any combination of Examples 31-33 may optionally include wherein the content server is a plurality of content servers.

In Example 35, the subject matter of one or any combination of Examples 31-34 may optionally include wherein the means for transferring the portion of the video content to the mobile device include means for keeping a network interface of the mobile device from entering an idle state until after the portion of the video content is transferred.

In Example 36, the subject matter of one or any combination of Examples 31-35 may optionally include wherein the means for keeping the network interface of the mobile device from entering an idle state include means for preventing a power transition timer running on the mobile device from expiring.

In Example 37, the subject matter of one or any combination of Examples 31-36 may optionally include wherein the means for transferring the portion of the video content to the mobile device include means for delaying transferring any of the portion of the video content until the portion of the video content is received from the content server.

In Example 38, the subject matter of one or any combination of Examples 31-37 may optionally include wherein the means for intercepting the request for video content include means for receiving information from a mobile application on the mobile device indicating the request for video content.

In Example 39, the subject matter of one or any combination of Examples 31-38 may optionally include further comprising means for intercepting all data sent by the mobile device.

In Example 40, the subject matter of one or any combination of Examples 31-39 may optionally include wherein one path of the multipath transport protocol includes a wireless protocol connection according to an IEEE 802.11 family of standards.

In Example 41, the subject matter of one or any combination of Examples 31-40 may optionally include wherein one path of the multipath transport protocol includes a 3rd Generation (3G) radio access technology (RAT) network connection that is a Universal Mobile Telecommunications System (UMTS) or Evolved High Speed Packet Access (HSPA+) standard based network.

In Example 42, the subject matter of one or any combination of Examples 31-41 may optionally include further comprising means for turning off the 3G RAT network connection when the video playback starts on the mobile device.

In Example 43, the subject matter of one or any combination of Examples 31-42 may optionally include wherein one path of the multipath transport protocol includes a 3rd Generation Partnership Project (3GPP) long term evolution (LTE) or LTE-advanced network connection.

In Example 44, the subject matter of one or any combination of Examples 31-43 may optionally include further comprising means for turning off the 3GPP LTE or LTE-advanced network connection when the video playback starts on the mobile device.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMS), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An intermediate media device to at least deliver video content, the intermediate media device comprising:
a processor to:
modify a request for video content from a mobile device, the request for video content intended for a content server;
forward the modified request for the video content to the content server;
receive the video content from the content server; and
transfer a portion of the video content to the mobile device while keeping a network interface of the mobile device from entering an idle state until after the portion of the video content is transferred.

2. The intermediate media device of claim 1, wherein to transfer the portion of the video content, the processor is to maintain a high throughput data connection with the mobile device until the portion of the video content is transferred to the mobile device.

3. The intermediate media device of claim 1, wherein the content server is a plurality of content servers.

4. The intermediate media device of claim 1, wherein to keep the network interface of the mobile device from entering the idle state, the processor is to prevent a power transition timer running on the mobile device from expiring.

5. The intermediate media device of claim 1, wherein to transfer the portion of the video content to the mobile device, the processor is to delay transferring any of the portion of the video content until the portion of the video content is received from the content server.

6. The intermediate media device of claim 1, wherein the processor is further to receive information from a mobile application on the mobile device indicating the request for video content.

7. The intermediate media device of claim 1, wherein the intermediate media device is to receive all data sent by the mobile device.

8. The intermediate media device of claim 1, wherein to transfer the portion of the video content to the mobile device, the processor is to transfer the portion of the video content using a multipath transport protocol.

9. A method for using an intermediary device to at least deliver video content comprising:
   modifying, at the intermediary device, a request for video content from a mobile device, the request for video content intended for a content server;
   forwarding the modified request for the video content to the content server;
   receiving the video content from the content server; and
   transferring a portion of the video content to the mobile device while keeping a network interface of the mobile device from entering an idle state until after the portion of the video content is transferred.

10. The method of claim 9, wherein transferring the portion of the video content includes maintaining a high throughput data connection with the mobile device until the portion of the video content is transferred to the mobile device.

11. The method of claim 9, further comprising, receiving a request for a second portion of the video content from the mobile device and transferring the second portion of the video content to the mobile device using a multipath transport protocol.

12. The method of claim 9, wherein keeping the network interface of the mobile device from entering the idle state includes preventing a power transition timer running on the mobile device from expiring.

13. The method of claim 9, wherein transferring the portion of the video content to the mobile device includes delaying transferring any of the portion of the video content until the portion of the video content is received from the content server.

14. The method of claim 9, wherein modifying the request for video content includes receiving information from a mobile application on the mobile device indicating the request for video content.

15. The method of claim 9, wherein transferring the portion of the video content to the mobile device includes using a multipath transport protocol.

16. At least one non-transitory machine-readable medium including instructions for receiving information, which when executed by a processor of an intermediate device, cause the processor to:
   modify a request for video content from a mobile device, the request for video content intended for a content server;
   forward the modified request for the video content to the content server;
   receive the video content from the content server; and
   transfer a portion of the video content to the mobile device while keeping a network interface of the mobile device from entering an idle state until after the portion of the video content is transferred.

17. The at least one machine-readable medium of claim 16, further comprising instructions that cause the processor to intercept all data sent by the mobile device.

18. The at least one machine-readable medium of claim 16, wherein the instructions to transfer the portion of the video content to the mobile device include instructions to use a multipath transport protocol.

19. An apparatus for using an intermediate content device to at least deliver video content comprising:
   means for modifying a request for video content, the request received from a mobile device, the request for video content intended for a content server;
   means for forwarding the modified request for the video content to the content server;
   means for receiving the video content from the content server; and
   means for transferring a portion of the video content to the mobile device while keeping a network interface of the mobile device from entering an idle state until after the portion of the video content is transferred.

20. The apparatus of claim 19, wherein the means for transferring the portion of the video content include means for maintaining a high throughput data connection with the mobile device until the portion of the video content is transferred to the mobile device.

21. The apparatus of claim 19, wherein keeping the network interface of the mobile device from entering an idle state includes means for preventing a power transition timer running on the mobile device from expiring.

22. The apparatus of claim 19, wherein the means for transferring the portion of the video content to the mobile device include means for using a multipath transport protocol.

* * * * *